(12) United States Patent
Watanabe et al.

(10) Patent No.: US 6,480,786 B2
(45) Date of Patent: Nov. 12, 2002

(54) METHOD AND SYSTEM FOR ROUTE GUIDING

(75) Inventors: Mitsuaki Watanabe; Hideaki Takeda; Katsunori Takahashi, all of Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/854,052

(22) Filed: May 11, 2001

(65) Prior Publication Data

US 2002/0010543 A1 Jan. 24, 2002

(30) Foreign Application Priority Data

May 15, 2000 (JP) ........................................ 2000-141855

(51) Int. Cl.⁷ ............................................. G01C 21/30
(52) U.S. Cl. ........................ 701/211; 701/200; 701/209; 340/988
(58) Field of Search ................................. 701/200, 207, 701/208, 209, 211, 23; 340/988, 990, 995

(56) References Cited

U.S. PATENT DOCUMENTS

| | | | | |
|---|---|---|---|---|
| 5,177,685 A | | 1/1993 | Davis et al. ................. | 955/456 |
| 6,078,865 A | * | 6/2000 | Koyanagi .................... | 701/211 |
| 6,144,318 A | * | 11/2000 | Hayashi et al. ............. | 340/995 |
| 6,266,613 B1 | * | 7/2001 | Nimura et al. .............. | 701/210 |

* cited by examiner

*Primary Examiner*—Gertrude Arthur
(74) *Attorney, Agent, or Firm*—Brinks Hofer Gilson & Lione

(57) ABSTRACT

A route guiding system and method for use with a navigation device that provides route guidance utilizing portions of speech uttered by a user to further guide the user to a location. The route guiding system includes a route guide request presence or absence determining unit and an institution extracting unit. The route guide request presence or absence determining unit determines whether a pre-registered a route guide request, such as "I see," is included in a user utterance. The institution extracting unit extracts a word related to an institution such as, "post office," from the user utterance. For example, if the user states, "I see a post office." The route guide request presence or absence determining unit identifies "I see" and the institution extracting unit identifies "post office." Further, the route guiding system may include a institution retrieving unit that retrieves institutions located near the position of a vehicle equipped with the navigation system of the invention, an institution candidate selecting unit that selects institutions located along a route guide from among the retrieved institutions, a user-uttered institution specifying unit that specifies an institution uttered by the user from among the selected institutions, and a route guide output unit that makes a guide according to the number of intersections located in the section from the specified institution up to a place to be guided.

15 Claims, 10 Drawing Sheets

FIG.9

NUMBER OF INTERSECTION FROM THE SPECIFIED INSTITUTION
UP TO A RIGHT-LEFT TURN INTERSECTION AND GUIDE EXAMPLES

| NUMBER OF INTERSECTION | GUIDE PATTERN | GUIDE EXAMPLE |
|---|---|---|
| ZERO | (1) | "TURN RIGHT (OR LEFT)" AT THE INTERSECTION OF THE "INSTITUTION" |
| ONE | (2) | "TURN RIGHT (OR LEFT)" AT THE INTERSECTION NEXT TO THE "INSTITUTION" |
| TWO OR MORE | (3) | "TURN RIGHT (OR LEFT)" AT THE INTERSECTION AHEAD OF THE "INSTITUTION" BY "THE NUMBER OF INTERSECTIONS" |

FIG. 10

EXAMPLE OF RETRIEVAL IN THE INSTITUTION RETRIEVING UNIT

| TYPE OF INSTITUTION | NAME OF INSTITUTION | DISTANCE FROM VEHICLE POSITION |
|---|---|---|
| POST OFFICE | MIDORIGAOKA YUBINKYOKU | 100 m |
| GAS STATION | ESSO HATANOTEN | 700 m |
| RESTAURANT | HENKOTSU | 700 m |
| ⋮ | ⋮ | ⋮ |

FIG. 11

EXAMPLE OF SPECIFYING AN INSTITUTION IN THE USER-UTTERED INSTITUTION SPECIFYING UNIT

| TYPE OF INSTITUTION | NAME OF INSTITUTION | DISTANCE FROM VEHICLE POSITION |
|---|---|---|
| POST OFFICE | MIDORIGAOKA YUBINKYOKU | 100 m |
| GAS STATION | ESSO HATANOTEN | 700 m |
| RESTAURANT | HENKOTSU | 700 m |
| ⋮ | ⋮ | ⋮ |

METHOD AND SYSTEM FOR ROUTE GUIDING

BACKGROUND OF THE INVENTION

1. Field of the Invention

The present invention relates to a method and system for route guiding. Particularly, the invention pertains to a navigation system capable of providing a guide route in response to questions posed by the user of the navigation system in association with institutions viewed by the user during a voice guiding process.

2. Description of the Prior Art

Navigation systems are provided with a map/information storing medium such as CD-ROM or DVD-ROM containing map data for plotting a map and information data such as place names and institutions to be displayed on the map, a reproducing unit for reading data from the map/information storing medium, a display unit for displaying a map, and a vehicle position detecting unit for detecting the current position and the travelling direction of the vehicle utilizing a self-contained navigation system such as a distance sensor or a gyro and a GPS receiver. According to such a navigation system, map data including the current position of the vehicle is read from the map/information storing medium. A map image around the vehicle position is then plotted on the screen of the display unit utilizing the map data read. Further, a vehicle position mark is displayed on the display screen and a map image is displayed by scrolling as the vehicle travels or a map image is fixed on the screen while the vehicle position mark is shifted. In this way where the vehicle is presently traveling can be seen at a glance. The information storage medium stores other institution-related information data that the user can retrieve and display.

The navigation system possesses a route guiding function for permitting the user to drive the vehicle easily toward a desired destination without selecting a wrong road. According to the route guiding function, a route of the lowest cost from an origin to a destination is searched with use of the map information, the route thus searched is stored as a guide route, and while the vehicle is travelling, the guide route is plotted on the map image thickly using a color different from the color of other routes. Further, when the vehicle approaches an intersection on the guide route where the vehicle is to change its course, within a predetermined certain distance, the intersection is displayed on a larger scale and an arrow or the like which represents a course changing direction is plotted on the screen. In connection with the display of intersection there also has been developed a navigation system wherein an intersection is displayed, for example, in three dimensions in almost the same state as the state in which the driver actually sees road in front of the vehicle.

The driver, however, must make efforts to drive the vehicle safely while checking the front and surrounding conditions because it is dangerous for the driver to direct his or her eyes to the navigation system frequently. Particularly, in the vicinity of an intersection the driver should refrain from directing his or her eyes to the navigation system because the possibility of traffic accident occurrence is high. In the conventional navigation system, in view of this point, not only image display but also voice guide is conducted so that the driver can pass an intersection safely. For example, as the vehicle approaches an intersection, a voice guide is given such as "about 700 m, to the right." According to such a voice guide function, by depressing "Voice Guide" button of the remote controller, a guide can be made at that point such as "Travel along the road for a while." and "5 km more, to the right."

As navigation systems become more popular, there is concern that there may be a greater number of accidents because the driver of a vehicle may look at the display portion of the navigation system too frequently or too long. For this reason there is a tendency to strengthening the restrictions on the navigation system. Consequently, a greater importance will be attached in future to such a voice guide.

When the above described voice guiding is conducted in the navigation system, particularly at an intersection where the vehicle concerned is to turn right or left, it is easier to understand the guiding process if the names of institutions as markers such as, for example, the names of gas stations, restaurants and convenience stores at or near the intersection are shown in addition to an approximate distance from the current position and right and left turn directions. In this case, for example, a guide is made such as "About 500 m ahead, to the right. Seven-Eleven is a marker."

In this connection, the navigation system is usually set to guide institution names which will probably be known to many people, but the institution names thus guided are not always be known to all of the people guided. More particularly, at the time of recording institution names for a guide on a map/information storage medium for navigation, the navigation system is set to guide the names of gas stations, family restaurants and convenience stores known well to vehicular drivers, as well as public institutions such as post offices, police stations and firehouses. However, for example as to institutions heretofore called "Kominkan (community center)" which many people have utilized before, they are often expressed in various new names when newly rebuilt later. For example, an institution called "Kashiwa Kominkan" before is now called "Amuse Kashiwa." This name change was made at the time of a recent reconstruction of the institution. In this case, at the time of setting the names of institutions for guide, the old "Kashiwa Kominkan is a marker." Is updated to "Amuse Kashiwa is a marker." However, at least for a fairly long period after that name change, many people will have no idea whether the institution is a restaurant or an amusement institution or a public institution.

In the above example, therefore, if a guide is made like "About 500 m ahead, to the right. Amuse Kashiwa is a marker." and if the vehicular driver is not familiar with this institution, it will not be until approaching the intersection that the driver searches for the institution, and so much attention is paid to checking which is the institution. Because traffic accidents are apt to occur in the intersection and the driver's attention is distracted while driving the vehicle near the intersection, the guide by the navigation system rather becomes dangerous.

In making a software for a navigation system and when preparing guide data for intersections or the like, an attempt is made to select appropriate institutions as markers as referred to above, but such institutions as known to most people are extremely limited. Particularly, there are various persons, including men and women of all ages, who utilize the navigation system and the object of interest differs depending on people, so the selection of institution names for guide is extremely difficult and appropriate institutions are not always selected.

Taking the above point into account, it may be effective to merely display the distance from the current travelling position up to a right-left turn intersection and a right-left turn direction on the basis of the current position data without guiding any marker institution, like "About 500 m ahead, to the right", or guide only the number of intersections and a right-left turn direction like "Turn left at the second intersection." However, since a large number of institution information pieces are stored in a data storage medium, it is desirable to utilize them in route guide effectively in some form or other.

Map data and institution data stored in a map/information data storage medium such as CD-ROM or DVD-ROM used in the navigation system is updated to new information frequently for the supply as version-up data to users. Therefore, it is desirable for navigation system users to purchase, for maintenance, a new data storage medium at every update. Actually, however, since the purchase requires the users to pay a charge, most users continue to use the original data. It follows that most of the users presently using navigation systems continue to use the original data until buying new cars or new navigation systems.

In the above voice guide for intersections, when an institution name as a marker is guided, if the institution no longer exists or has changed to another institution, the user of the navigation system using old data is required to search for the guided institution in the vicinity of the intersection, which is very dangerous. Particularly, in the case of chain restaurants and convenience stores, they tend to undergo drastic changes unlike roads and the like, so there is a fear that such conditions may occur frequently in a navigation system that guides institution names. A countermeasure may be eliminating such institutions from the guide. However, since correct data is stored in the data storage medium despite limited inappropriate data, it is desirable to utilize it effectively in some form or other.

Further, with the recent advance of the voice recognition technology, a voice recognizing unit has been developed wherein various operations can be done with a voice without any operation on the user side for keys and touch panel provided in a navigation system. In a navigation system equipped with such a voice recognizing unit, operational portions so far operated manually can be operated with a voice wherein the user must utter predetermined words in accordance with a predetermined operation sequence.

SUMMARY OF THE INVENTION

Accordingly, it is an object of the present invention to provide a route guiding system with a voice output which, when guiding a route with use of information on institutions stored in a data storage medium, can account for institutions unknown to the user and institutions that no longer exist, and can guide with a voice in response to a questionary speech based on an institution viewed by the user. It is another object of the present invention to provide a route guiding method in a navigation system that can fulfill such functions.

According to one embodiment of the present invention, a navigation system includes an institution name extracting unit that extracts an institution name from a voice uttered by a user of the navigation system, an institution retrieving unit that retrieves, from stored institution data institutions located near the position of a vehicle equipped with the navigation system on the basis of the institution name extracted by the institution name extracting unit, a user-uttered institution specifying unit that specifies an institution corresponding to the institution name uttered by the user from among the retrieved institutions, and a route guide unit that, when an institution has been specified by the user-uttered institution specifying unit, aurally guides a route from the specified institution to a place to be guided.

In another embodiment of the present invention, a navigation system includes a voice recognizing unit that recognizes a voice uttered by a user of the navigation system, a route guide request presence or absence determining unit that determines whether a speech of a route guide request is included in the voice recognized by the voice recognizing unit, an institution name extracting unit that extracts an institution name from the voice recognized by the voice recognizing unit, an institution retrieving unit that retrieves from stored institution data institutions located near the position of a vehicle equipped with the navigation system on the basis of the institution name extracted by the institution name extracting unit, a user-uttered institution specifying unit that specifies an institution corresponding to the institution name uttered by the user from among the retrieved institutions, a route guide unit that when it is determined by the route guide request presence or absence determining unit that there has been a route guide request and when an institution has been specified by the user-uttered institution specifying unit, guides a route from the specified institution up to a place to be guided, and a voice synthesizing unit that converts a signal provided from the route guide unit into a voice signal and outputs the voice signal.

In a further embodiment of the present invention, the route guide request presence or absence determining unit is provided with a dictionary unit in which are registered such speeches as "I see", "How many more meters?", "That's okay, isn't it?", and "This is not the place, is it?".

In a still further embodiment of the present invention, the route guide unit calculates the number of intersections or traffic lights located in between the specified institution and the place to be guided and makes a route guide in accordance with the calculated number.

In a still further embodiment of the present invention, when the institution name extracted by the institution name extracting unit is not included in the speech portion uttered by the user or when the institution uttered by the user is not specified by the user-uttered institution specifying unit, the route guide unit guides an institution name as a marker from among the retrieved institution data.

In a still further embodiment of the present invention, a navigation system includes a marker name recognizing unit that recognizes a marker name related to a guide route from a speech portion uttered by a user of the navigation system, a marker retrieving unit that retrieves from stored marker data markers located near the position of a vehicle equipped with the navigation system on the basis of the marker name recognized by the marker name recognizing unit, a user-uttered marker specifying unit that specifies a marker corresponding to the marker name uttered by the user from among the retrieved markers, and a route guide unit that when a marker has been specified by the user-uttered marker specifying unit, aurally guides a route from the specified marker up to a place to be guided.

According to a still further embodiment of the present invention, the markers are institutions and intersections.

According to a still further aspect of the present invention, a route guiding method in a navigation system comprises the acts of recognizing a voice uttered by a user of the navigation system, specifying an institution name from the recognized voice, retrieving, from among stored institution data, institutions located near the position of a vehicle equipped with the navigation system on the basis of the specified institution name, specifying an institution corresponding to the institution name uttered by the user from among the retrieved institutions, and aurally guiding a route from the specified institution up to a place to be guided.

BRIEF DESCRIPTION OF THE DRAWINGS

FIG. 9 is a table showing a guide example in which a change is made from one guide pattern to another according to the number of intersections located in between a specified institution and an intersection where the vehicle concerned is to turn right or left in the present invention;

FIG. 10 is a table showing an example of retrieval made by an institution retrieving unit used in the present invention; and FIG. 11 a table showing an example in which an institution has been specified by a user utterance institution specifying unit from among retrieved institutions.

DETAILED DESCRIPTION OF A PREFERRED EMBODIMENT

Figure 1:
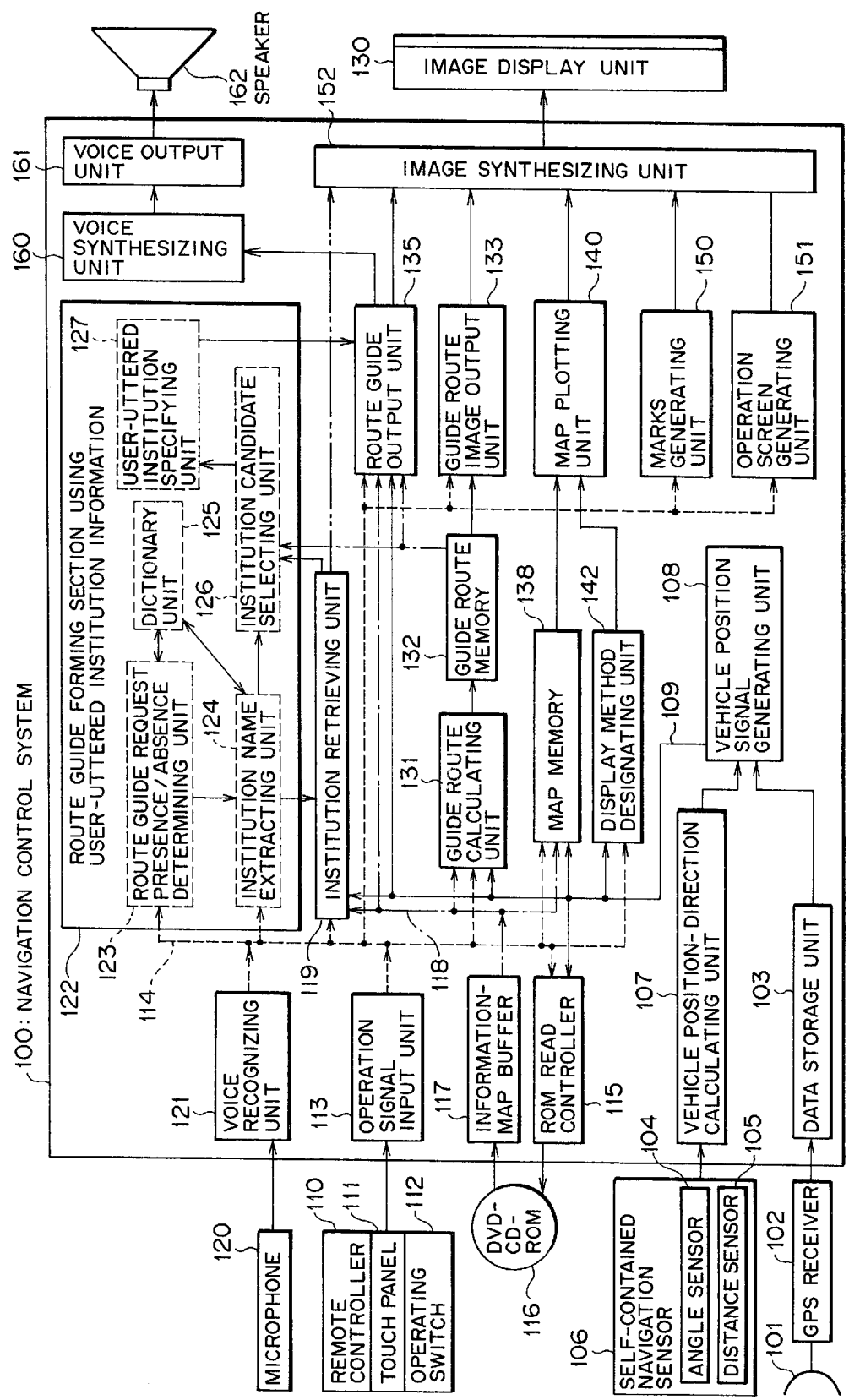
FIG. 1 is a functional block diagram showing a correlation among functional blocks in an embodiment of the present invention.

An embodiment of the present invention will now be described with reference to the accompanying drawings. FIG. 1 is a functional block diagram of a navigation control system 100 used in a navigation system. In the same figure, a signal from a satellite received by an antenna 101 is processed by a GPS receiver 102 and data on the position of a vehicle equipped with the navigation system based on the signal from the satellite is stored in a data storage unit 103. A signal provided from a self-contained navigation sensor 106 installed in the vehicle and which comprises an angle sensor 104 for detecting a vehicular travelling direction and a distance sensor 105, is inputted to a vehicle position-direction calculating unit 107, which in turn provides position data based on the signal provided from the self-contained navigation sensor.

In a vehicle position signal generating unit 108, the vehicle position data by GPS stored in the data storage unit 103 is corrected by the position data present in the vehicle position-direction calculating unit 107 to ensure correct vehicle position data. The vehicle position signal obtained in the vehicle position signal generating unit 108 is outputted through a vehicle position data line 109 to various functional units installed in the navigation control system 100 which will be described later, and is utilized in those functional units.

User's operation signals provided from a remote controller 110, a touch panel 111 provided in a display and various operating switches 112, which are annexed to the navigation system, are fed to an operation signal input unit 113. The operation signal input unit outputs the signals as user's direction signals to various functional units in the navigation control system 100 through an operation signal data line 114. A microphone 120 is connected to a voice recognizing unit 121 that recognizes a user's voice inputted from the microphone. Like the operation signal input unit 113, the voice recognizing unit 121 connects the inputted voice as a phonetic operation signal to the operation signal data line 114, through which the signal is fed as a direction signal to various functional units to be described later.

In accordance with the above vehicle position data and operation signals, a ROM read controller 115 reads predetermined map data and various information pieces from a map storage medium (hereinafter referred to simply as "DVD-ROM") such as DVD-ROM or CD-ROM. The DVD-ROM stores a large amount of map data and information data on institutions. This information is read by the ROM read controller 116 and stored in an information-map buffer 117. Various data stored in the information-map buffer 117 is outputted to various functional units in the navigation control system 100 through an information-map data line 118 and is utilized for various purposes to be described later. Particularly, in accordance with a signal indicative of the position of the vehicle equipped with the navigation system that is provided from the vehicle position signal generating unit 108, or with a display direction provided from the operation signal data line 114, the data stored in the information-map buffer 117 is inputted to a map memory 138.

With such various data inputted, the navigation control system 100 can perform various operations in its various functional units installed in the interior of the control system. For example, a guide route calculating unit 131 inputs the current position data from the vehicle position signal generating unit 108, receives directions for retrieval such as designated destination and routing places, as well as expressways with priority given thereto, from the operation signal data line 114 and performs various calculations of costs to determine an optimum guide route. The result thus obtained is stored in a guide route memory 132. Then, a guide route image output unit 133 forms image data for the guide route and outputs the image data to an image synthesizing unit 152, which in turn synthesizes an image. The image thus formed can be displayed on an image display unit 130 in a superimposed state on a map.

In accordance with the vehicle position data provided from the vehicle position signal generating unit 108, map data provided from the information map buffer 117, peripheral institution data provided from an institution retrieving unit 119, and guide route information from the guide route memory 132, a route guide output unit 135 determines whether the current vehicle position has reached a position near an intersection at which the vehicle is to turn right or left on the guide route, and if the answer is affirmative, the route guide output unit 135 draws an intersection guide map and outputs the map to not only the image synthesizing unit 152 but also a voice synthesizing unit 160, which in turn outputs a voice of intersection guide or the like through a speaker 162. In this route guide, an institution as a marker located near the intersection at which the vehicle is to turn right or left is retrieved and a guide is generated. For example, the guide may include the statement, "About 500 m ahead, to the right. Seven-Eleven is a marker." The route guide output unit 135 not only makes such an intersection guide as mentioned above but also makes, as necessary, a guide for entrance/exit of an interchange and a guide to the effect that there will be not right-left turn intersection for a while. In addition to such a conventional guide method, institution information uttered by the user and specified by a user-uttered institution specifying unit 127 which will be described later is inputted to the route guide output unit 135, which in turn can prepare and output a route guide data based on the inputted institution information.

In accordance with the directions provided from the operation signal data line 114 or the vehicle position signal from the vehicle position signal generating unit 108, the institution retrieving unit 119 retrieves and fetches institution information stored in the DVD-ROM 116 from the information-map data line 118, allowing the retrieved data such as peripheral institutions to be displayed on the image display unit 130 through the image synthesizing unit 152 and allowing institution marks to be displayed on the map. Further, the institution retrieving unit 119 inputs from an institution name extracting unit 124 an institution name uttered by the user, then retrieves the institution corresponding to the institution name inputted and outputs the institution retrieved to an institution candidate selecting unit 126.

On the basis of map data of a predetermined reduced scale stored in the map memory 138 and in accordance with designation, e.g., a bird's eye view display or a three-dimensional display, provided from the operation signal input unit 113 and the voice recognizing unit 121 through a display method designating unit 142, a map plotting unit 140 makes calculations and draws a predetermined map with the vehicle position as a reference. The map plotting unit 140 also displays related information data such as place names and institution names on the map overlappedly as necessary, and outputs the map as a map image to the image synthesizing unit 152. Where required, images from a marks generating unit 150 and an operation screen generating unit 151 are also inputted to the image synthesizing unit 152. These images are combined and displayed on the image display unit 130.

The navigation control system is provided with a route guide forming section 122 using user-uttered institution information, which includes a route guide request presence/absence determining unit 123. The route guide request presence/absence determining unit 123 detects from the user voice whether a speech term signifying a request to the navigation system for a guide was inputted and determines whether the user is requesting a route guide. For example, the terms "I see," or how many more meters" may be used to identify that the user seeks a guide from the navigation system. The specific speech is registered in a dictionary unit 125 beforehand and the route guide request presence/absence determining unit 123 can make the determination by detecting whether the inputted speech is coincident with the speech registered in the dictionary unit 125.

The route guide forming unit 122 is also provided with the institution name extracting unit 124, which, upon output of a signal indicative of a route guide request from the route guide request presence/absence determining unit 123, determines whether an institution such as "post office", "restaurant", or "Seven-Eleven" was uttered by the user and extracts and specifies the name of the institution concerned. Also as to institutions, if they are registered in the dictionary unit 125 beforehand, the determination can be made by collation with them. As institution names to be registered, they may be general institution names. For example, as to the institution name "Tone Ohashi", the word "Hashi" may be registered, and as to "Hiragata Tunnel", the word "Tunnel" may be registered. Further, as to those usually displayed as landmarks on a road map such as "Seven-Eleven," "Lawson," "Esso," and "Shell Sekiyu," those store names may be registered. Thus, a small memory capacity suffices.

Further, the route guide forming section 122 is provided with the institution candidate selecting unit 126 which, from among institutions located in a predetermined area retrieved by the institution retrieving unit 119, selects as institution candidates those located along the guide route inputted from the guide route memory 132. The route guide forming section 122 is further provided with the user-uttered institution specifying unit 127 that specifies an institution considered to be most appropriate in relation to the current position of the vehicle from among the institution candidates located on the guide route and selected by the institution candidate selecting unit 126. The institution specified from the user-uttered speech is outputted to the route guide output unit 135, which in turn, on the basis of the specified institution, forms guide information on an intersection at which the vehicle is to next turn right or left. The route guide output unit then forms an image from the guide information and outputs the image to the image synthesizing unit 152 and further makes the guide information into text data and outputs the text data to the voice synthesizing unit 160.

Figure 2:
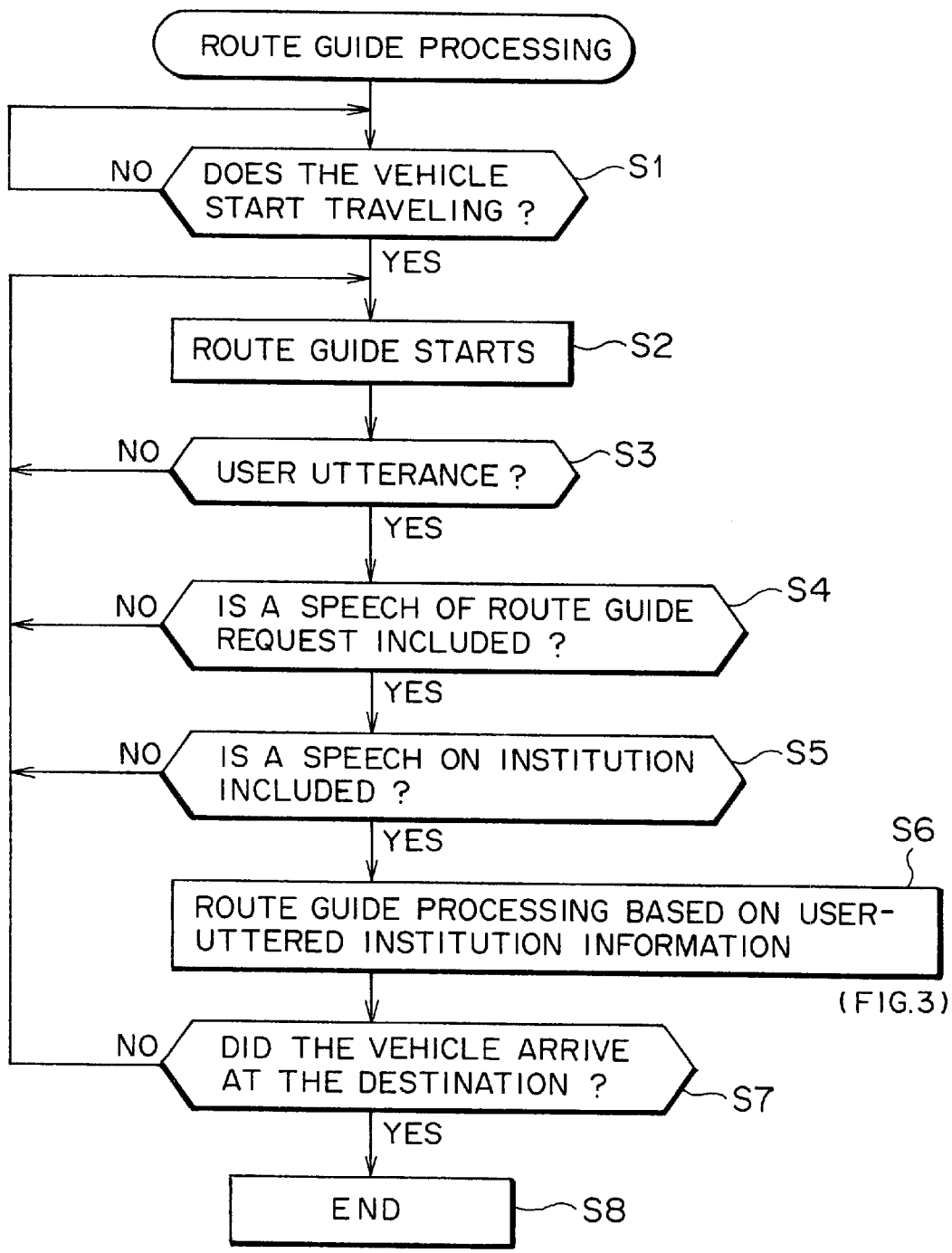
FIG. 2 is an operation flow diagram showing a basic operation flow of route guide according to an embodiment of the present invention.
Figure 3:
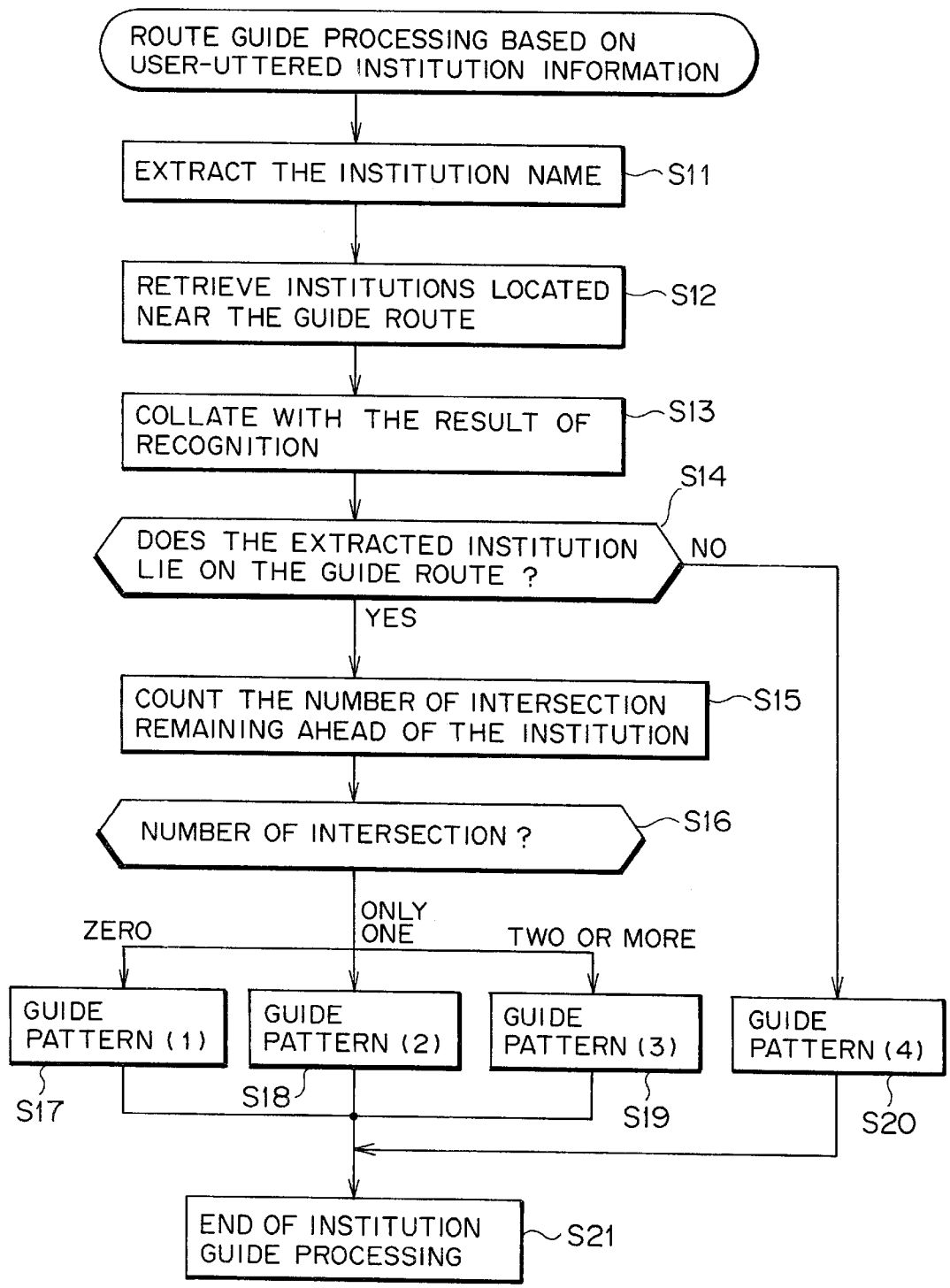
FIG. 3 is an operation flow diagram of a route guide processing section based on institution information uttered by a user in FIG. 2.

In the navigation control system constituted by the above functional blocks, route guide processing is performed successively in accordance with such operation flows as shown in FIGS. 2 and 3. An operation example will be described below with reference to a vehicle travelling condition shown in FIG. 4 and also to the functional block diagram of FIG. 1.

A basic operation flow of the route guide processing carried out by the navigation system according to the present invention is illustrated in FIG. 2. When the vehicle equipped with the navigation system starts travelling (act S1), there initially is performed an ordinary route guide processing like the conventional processing (act S2). More specifically, in the navigation control system 100 shown in FIG. 1, a guide is made like, for example, "About 500 m ahead, to the right." by the route guide output unit 135, as noted earlier, and further there is made a guide like "Seven-Eleven is a marker." as a guide for an institution which serves as a marker for right or left turn. In this case, such institution information as "Seven-Eleven" is obtained by retrieving various data on the institution information stored in the data storage medium, e.g., data related to landmarks.

Next, a check is made to see whether user utterance is present (act S3). This can be judged by detecting whether a user voice has been inputted from the microphone 120 in FIG. 1 to the voice recognizing unit 121, for example, by pushing a voice recognition starting switch. If the answer in step S3 is negative, the ordinary route guide processing in step S2 is continued until user utterance.

On the other hand, if it is determined in act S3 that a voice for recognition has been uttered to the voice recognizing unit 121 from the user, a check is made to see whether predetermined speeches which have been registered beforehand in the dictionary unit 125 as speeches asking the navigation system for route guide are included in the user utterance (act S4). For example, "I see" in "I see a post office.", "How many more meters" in "The vehicle is going to cross over TONE OHASHI, but how many more meters", and "That's okay, isn't it?" in "The vehicle is going to enter HIRAGATA TUNNEL, but that's okay, isn't it?" may be identified. If it is judged that the above questioning speeches are not included in the user utterance, the flow returns to act S2 to repeat the ordinary route guide processing.

If it is judged in act S4 that the above route guide requesting speeches are included, a check is made to see whether a speech on institution is included in the user utterance, which can be judged on the basis of whether any of the speeches pre-registered in the dictionary unit 125 is included like above. In the dictionary unit 125 are pre-registered, for example, the word "YUBINKYOKU (post office)" which is a senior, or generic, classification item of such specific institution names as "MIDORIGAOKA YUBINKYOKU" and "KASHIWA YUBINKYOKU", the word "SEVEN-ELEVEN" which is a generic classification item of such specific institution names as "SEVEN-ELEVEN HITACHIDAI TEN" and "SEVEN-ELEVEN KASHIWA TEN", and further the word "convenience (convenience store)" which is a more generic classification item.

As a result of the above judgment, even in the case where a preregistered user's questioning speech for the navigation system such as, for example, "that's okay, isn't it?" in "The vehicle is going to travel straight ahead, but that's okay, isn't it?" is included, if it is judged that there is included no speech relating to institution, the user's route guide request in the foregoing act S4 is regarded as being not a route guide request based on institution and the flow returns to act S2 to repeat the ordinary route guide processing. In the above example, the navigation system performs such an ordinary route guide as "Yes. Go straight ahead 5 km or so." or "No. 500 m more, to the right. Seven-Eleven is a marker."

If it is determined in act S5 that a speech relating to an institution is included, a route guide processing using user-uttered institution information as is shown in FIG. 3 (act S6) is performed. After this processing, a check is made to see whether the vehicle has arrived at the destination (act S7). If the answer is negative, the flow returns to act S2 to repeat the above operations. On the other hand, if the vehicle has arrived at the destination, this processing flow is ended (act S8).

The route guide processing using user-uttered institution information in act S6 referred to above is carried out along such an operation flow as shown in FIG. 3. This operation flow will now be described with respect to a vehicular travelling condition as shown in a perspective map diagram of principal portions of FIG. 4, a planar map of FIG. 5, a modification thereof of FIG. 6 and a planar map of FIG. 7. In the illustrated vehicular travelling condition it is here assumed that a user on a vehicle M travelling on a road L has seen a post office P when a guide route is set so that the vehicle M turns right at an intersection C and proceeds on road S, as indicated with an arrow in the figure. At this time, if the user utters "I see a post office." to the voice recognizing unit 121 in FIG. 1, then in act S1 1 in FIG. 3 the institution name "post office" is extracted from the user utterance.

In the case of a general institution name like the above "post office", the extraction of the institution name fulfills the same function as judging whether a speech on institution is included in the user utterance which judgment is made in act S5 shown in FIG. 2. For example, in the case of a speech indicating a specific post office like "MIDORIGAOKA YUBINKYOKU was seen.", the institution name "MIDORIGAOKA YUBINKYOKU" is extracted in act S11 shown in FIG. 3 and thus an operation different from that in act S5 is performed.

Then, on the basis of the institution name thus extracted, the institution which the user has seen is specified. Therefore, first in the institution retrieving unit 119 shown in FIG. 1, institutions located around the current vehicle position are retrieved on the basis of the current vehicle position data provided from the vehicle position signal generating unit 108 (act S12). In this case, the range of retrieval for institutions located around the vehicle is set beforehand, e.g., within 1 km. This range may be set according to travelling areas. For example, in a narrow street area it is set narrow, while in a city road area it is set wide.

As a result, such institutions as shown in the table of FIG. 10 are retrieved in the above example. In the example being considered, such institution information data as "MIDORIGAOKA YUBINKYOKU", "ESSO HATANOTEN", and "HENKOTSU" are retrieved as a post office, a gas station, and a restaurant, respectively. The table of FIG. 10 further shows that the following data were obtained on the basis of the retrieved data: "MIDORIGAOKA YUBINKYOKU" lies 100 m from the vehicle position, "ESSO HATANOTEN" lies 700 m ahead, and "HENKOTSU" also lies 700 m ahead.

The institutions thus retrieved and extracted are then collated with the institution name which has been recognized and extracted in acts S11 and S13. On the basis of this collation it is determined whether "post office" or "MIDORIGAOKA YUBINKYOKU" as the result of the recognition lay on the guide route (act S14). In the table of FIG. 11 this condition coincides with the data showing that an institution having an institution type of "post office" and an institution name of "MIDORIGAOKA YUBINKYOKU" lies at a distance of about 100 m. Thus, it is seen that the institution name uttered by the user is present on the guide route. At this time, the number of intersections remaining ahead of that institution up to an intersection where the vehicle is to turn right or left on the guide route is counted (act S16). Then, in accordance with the number of intersection thus counted there is selected one of guide patterns (1) (act Si17), (2) (act S18), and (3) (act S19) which will be described later. Further, when it is judged in act S14 that the institution uttered by the user does not exist at least on the guide route, the guide pattern (4) which makes the same guide as in the prior art, is selected. After the above predetermined guide has been made, this processing flow is ended (act S21) and the program proceeds to act S7 in FIG. 2.

Figure 4:
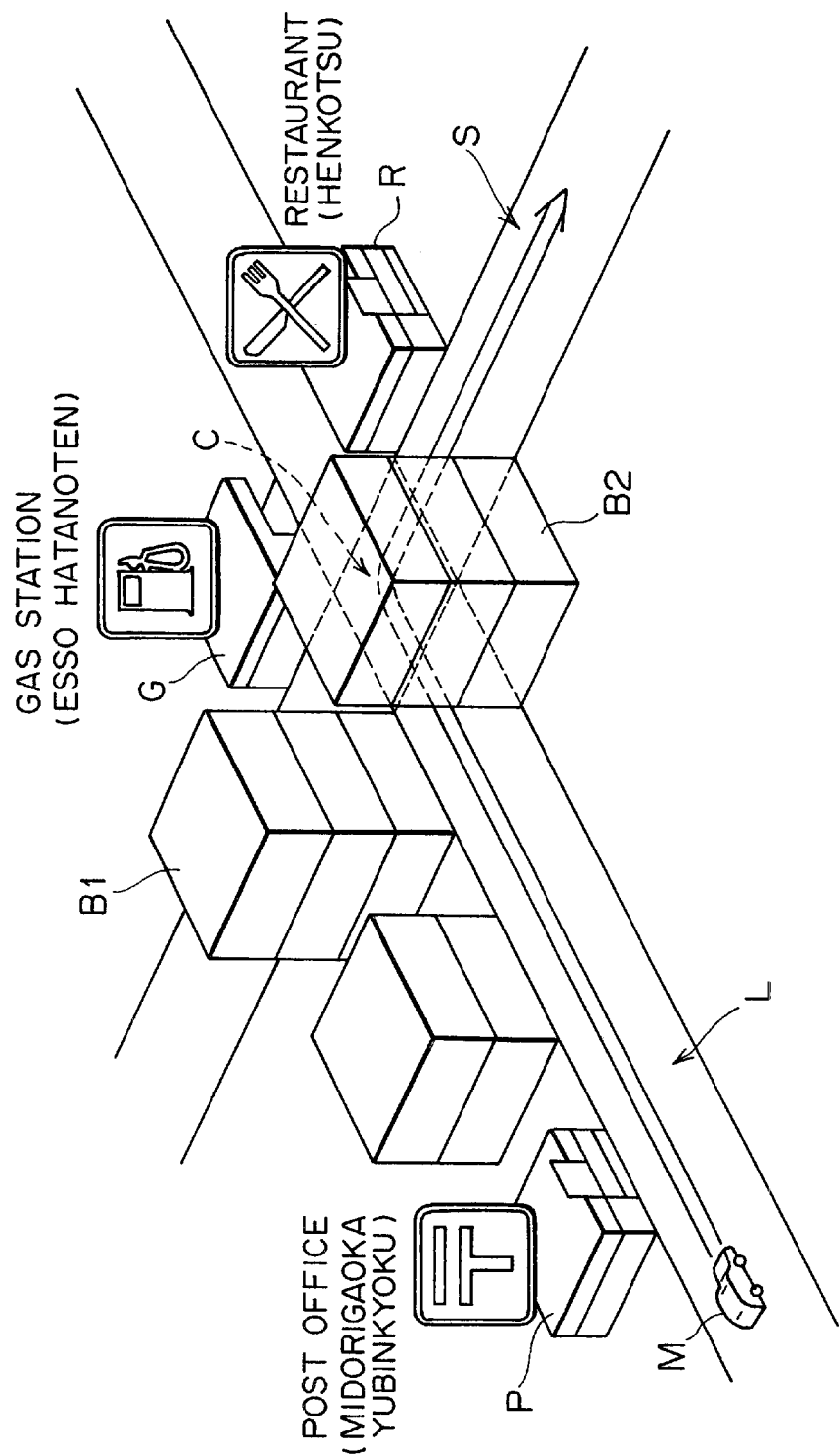
FIG. 4 is a perspective map diagram showing an example of a vehicular travelling condition.
Figure 5:
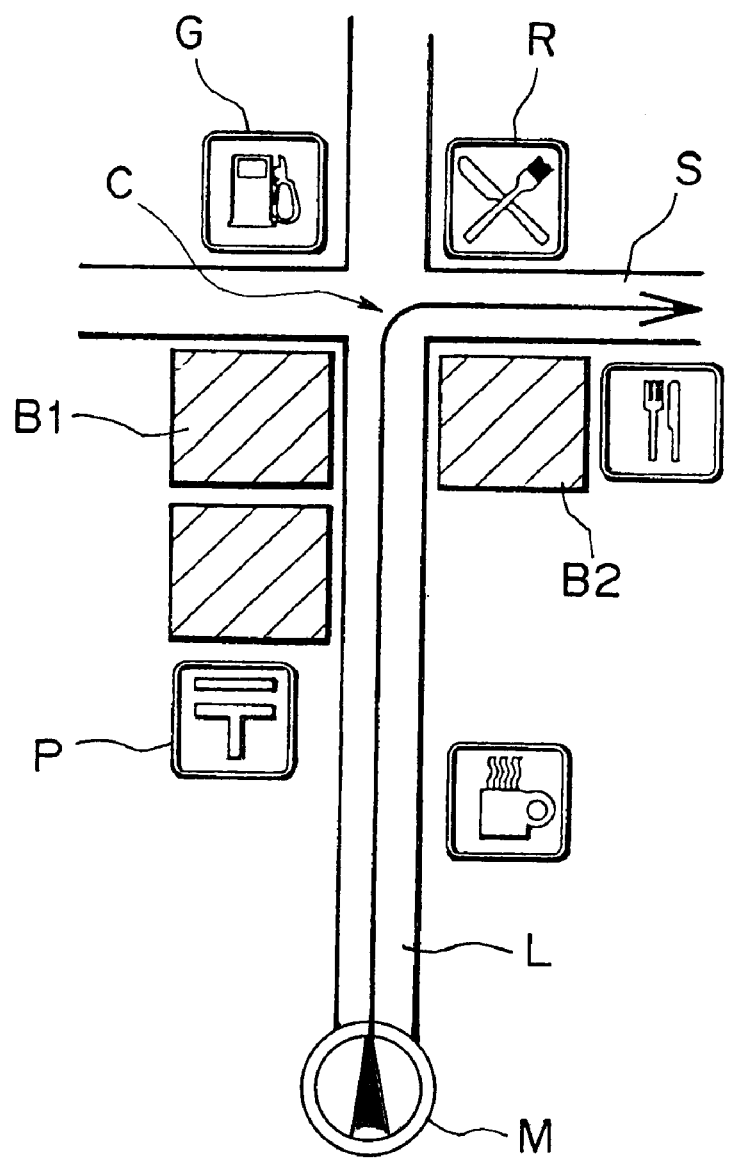
FIG. 5 is a planar map thereof.
Figure 6:
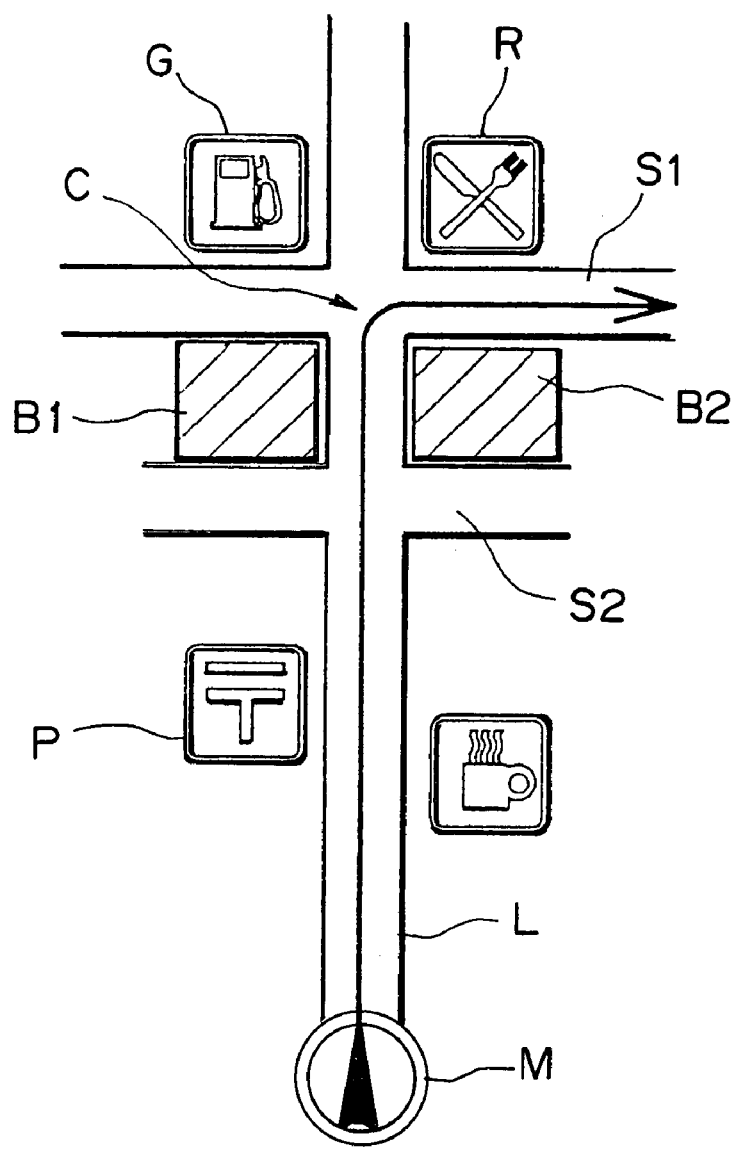
FIG. 6 is a planar map showing another example of a vehicular travelling condition.

The above guide patterns can be practiced in various modes, for example in such a mode as shown in the table of FIG. 9. That is, when the vehicle is in such a condition as shown in FIGS. 4 and 5, the post office as an institution which has been found out lies on this side of the intersection where the vehicle is to turn right or left, and the number of residual institution is zero, so that the guide pattern (1) is selected and a guide is made like "[Turn right (or left)] at the intersection of that [institution]." When the vehicle is in such a condition as shown in FIG. 6, a guide is made like "[Turn right (or left)] at the intersection next to that [institution]. " In the case where the institution in question is spaced a certain distance from the first right-left turn intersection, confusion may occur with the condition shown in FIG. 5 and the vehicle may turn right at the first intersection, so in this case a guide may be made like "Turn right at the second intersection." Further, in such a vehicular travelling condition as indicated at M1 in FIG. 7, since there remain three intersections, there is selected the guide pattern (3) which is applied to the case where the number of residual intersection is two or more, and a guide is made like "[Turn right (or left)] at the intersection located ahead of that [institution] by [the number of intersections]."

A series of actual processings performed in the example of such a vehicular travelling condition as shown in FIGS.

Figure 7:
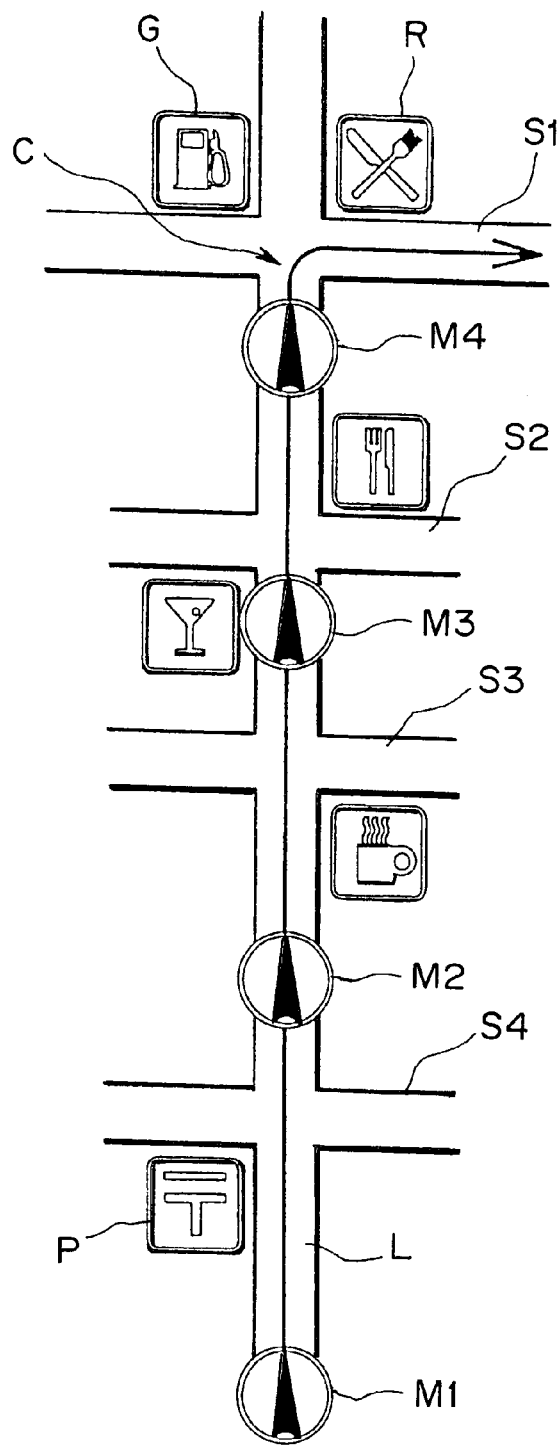
FIG. 7 is a planar map showing a further example of the vehicular travelling condition.

4 and 5 will now be described together in order. The institution name "post office" is extracted from the user voice "I see a post office." (act S11), then institutions located near around the guide route are retrieved (act S12) and are collated with the "post office" as the result of recognition (act S13), then it is determined that the post office lies on the guide route in the vicinity of the current vehicle position (act S14), so the number of intersection located up to the right-left turn intersection C is counted (act S15). As a result, since the number of residual intersection is zero, the guide pattern (1) is selected (act S17) and a guide is made like "Turn right at the intersection ahead of the post office." to complete the institution guide processing (act S21). In such a vehicular travelling condition as shown in FIG. 6, a guide is made like "Turn right at the intersection next to the post office." or "Turn right at the second intersection from the post office." In such a vehicular travelling condition as shown in FIG. 7, a guide is made like "Turn right at the third intersection ahead of the post office."

In the example shown in FIG. 4, according to the conventional route guide method, a guide is made, for example, like "Turn right at the intersection 300 m ahead. A marker is a gas station." Alternatively, a restaurant may be selected as a marker institution and a guide is made like ". . . A marker is a restaurant." However, as illustrated in the figure, since high buildings B1 and B2 are existent on this side of the intersection C, neither a gas station G nor a restaurant R can be seen from the current vehicle position. Therefore, if a guide is made by the above conventional method, the vehicle driver will feel uneasy about finding out the place where the guided intersection lies, and may become negligent in safe driving. In the present invention, however, since a guide is made as above, such an institution as cannot be seen by the driver is not guided, but there is made a guide based on institutions capable of being seen.

The navigation system according to the present invention which performs the above route guide will now be described in comparison with the conventional guide method and with reference to FIG. 7 which shows a further example of a series of vehicular travelling conditions. In the same figure, a guide route is set so that a vehicle M passes a road L, turns right at an intersection C and then passes a road S1. It is here assumed that the user uttered the speech "A post office was seen." when the vehicle M is at the position M1 700 m on this side from the intersection C at which the vehicle is turn right. At this time, if the post office is specified by conducting an institution retrieval of the post office in the manner described above, the navigation system guides like "Turn right at the third intersection ahead of the post office." In the above condition, according to the conventional navigation system, there is first made such a voice guide start sign as the sound [po:n] and thereafter a guide is made as follows: "Turn right about 700 m ahead. A restaurant HENKOTSU is a marker."

Next, if the user uttered "I see a hospital." when the vehicle is passing the position M2 about 500 m ahead of the intersection C and if it is determined even after institution retrieval that no hospital is present near the vehicle, for example, due to the omission of entry into map data or because the hospital has been built just recently, the navigation system makes the same guide as in the prior art like "Turn right about 500 m ahead. A restaurant HENKOTSU is a marker."

If the user uttered "I see an eating house." when the vehicle is passing the position M3 about 300 m ahead of the intersection C and if the eating house was specified as a result of institution retrieval, the vehicle is to turn at the second intersection from the current vehicle position, but since the number of residual intersection from that eating house is zero, there is made a guide like "Turn right at the intersection ahead of the eating house." In such a condition, according to the conventional navigation system, the following guide is made after the first sign given by the voice command: "Turn right about 300 m ahead. A restaurant HENKOTSU is a marker."

If the user uttered "I see a gas station." when the vehicle is passing the position M4 in the figure and if that institution is specified, it is determined that the number of intersection remaining in the section from the intersection where the gas station is located up to the intersection where the vehicle is to turn right or left is zero, and therefore a guide is made like "Turn right at the intersection of the gas station." In such a condition as above, the conventional navigation system makes a guide like "Turn right soon. A restaurant HENKOTSU is a marker." In the conventional system, when a signboard of the restaurant HENKOTSU is not found out, the user will be confused at this intersection in any of the above cases.

Although in the above example a guide is made on the basis of the speech "I see" uttered by the user, it is possible to make setting so that, as partially mentioned above in connection with act S3 in FIG. 2, the navigation system starts a route guide based on institutions also when the user has uttered, together with a speech on institution, a questioning speech "How many more?" or a confirming speech "That's okay, isn't it?" or "This is not the place, is it?". But, as mentioned above in connection with act S4 in FIG. 2, when the user uttered "The vehicle is going to travel straight ahead, but that's okay, isn't it?", the route guide based on institution information is not performed, but an ordinary route guide is performed.

Figure 8:
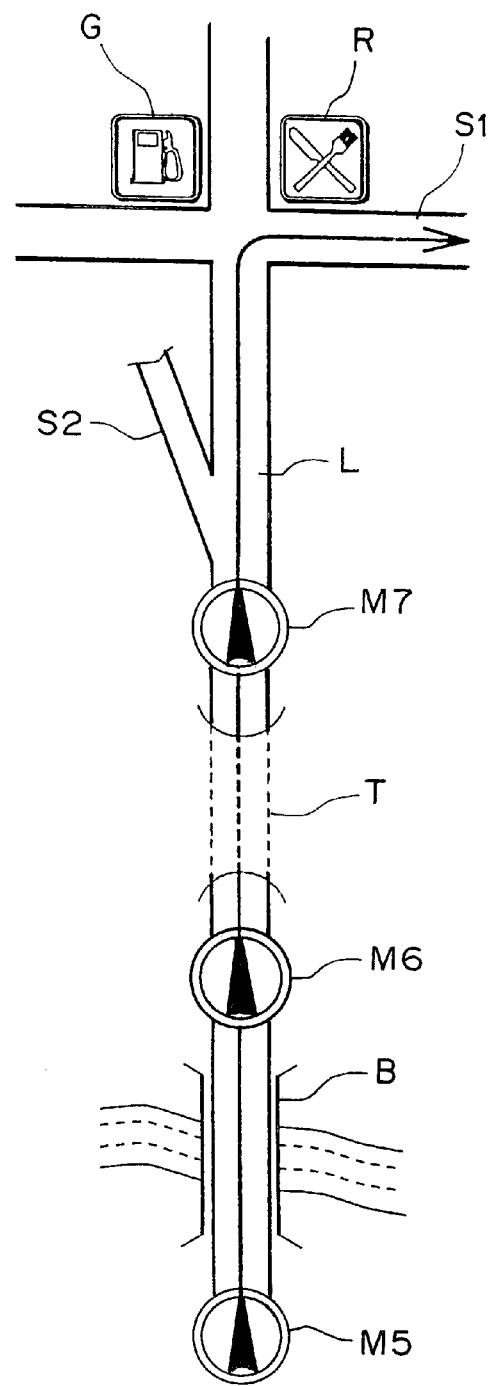
FIG. 8 is a planar map showing a still further example of the vehicular travelling condition.

For example, a description will now be given about such a series of vehicular travelling conditions as shown in FIG. 8. When the vehicle now passing the position M5 is going to cross over a bridge B and when in this condition the vehicle driver has seen the indication of the bridge name or the river name and uttered, for example, "The vehicle is going to cross over TONE OHASHI, but how many more meters?" or "The vehicle is going cross over TONEGAWA, but how many more meters?", the speech "how many more meters?" is extracted and it is possible to determine from the extracted speech that the speech is an inquiry to the navigation system if the user registers this speech beforehand in the dictionary unit 125 in FIG. 1 as a questioning speech for the navigation system. Moreover, by extracting the word "HASHI (bridge)" in "TONE OHASHI" or the word "GAWA (river)" in "TONEGAWA" from the user utterance, it is determined that the speech in question is an inquiry about an institution. Further, when "TONEOHASHI" or "TONEGAWA" is retrieved, then collated with the current vehicle position and the existence thereof has been confirmed, the navigation system guides as follows: "Follow the road for a while. 1 km more, turn right."

It is here assumed that when the vehicle is passing the position M6, the user became aware of the vehicle going to enter a tunnel and felt uneasy whether it would be all right to enter the tunnel, then uttered to the voice recognizing unit such a confirming speech as "The vehicle is going to enter MATSUDO TUNNEL, but that's okay, isn't it?" for example after having known the name of the tunnel. In this case, by registering the confirming speech "all right, isn't it?" beforehand into the dictionary unit 125 as a questioning speech for the navigation system, it is determined that the speech is an inquiry for the navigation system. Then, in the same way as above, "MATSUDO TUNNEL" is retrieved and collated with the current vehicle position to get confirmation, whereupon the navigation system guides as follows: "Yes, turn right 500 m ahead of MATUDO TUNNEL."

When the vehicle is passing the position M7 and when the user has seen the entrance of "IWAKI INTERCHANGE", if the user felt uneasy whether the vehicle is to enter the interchange through the said entrance and uttered to the voice recognizing unit such a confirming speech as "I see the entrance of IWAKI INTERCHANGE, but this is not the place, is it?" after having known the name of the interchange from a sign on the road for example, then if the confirming speech "This is not the place, is it?" is registered beforehand as a questioning speech for the navigation system into the dictionary unit, it is possible to determine that the speech in question is an inquiry for the navigation system because it is included in the registered speeches. Then, after "IWAKI INTERCHNAGE" has been confirmed by the same processing as above, the navigation system makes a guide like "Yes, turn right at the next intersection."

As in the above example of "IWAKI INTERCHANGE" it is a traffic interchange and an expressway entrance information that the user has seen, so unlike the foregoing examples of various institutions, the navigation system answers the user utterance of a marker related to the road network and makes a route guide from that marker. Thus, in the present invention, the navigation system may be set so as to respond not only to "institution" which the user has seen as in the above various examples but also to various markers related to the guide route capable of being seen by the user such as intersections, including the above traffic interchange. Therefore, the navigation system may be set such that upon user utterance of an intersection name which was seen, like "I see KOZUKA KOSATEN", the navigation system retrieves related information and makes a route guide from that intersection as a marker up to an intersection at which the vehicle is to turn right or left. Further, if the user utters, for example, "MIDORIGAOKA 2-CHOME" upon seeing a signboard thereof attached to a telegraph pole, the user can be given a route guide from that position.

In addition to the above examples, if various modes of speeches are stored beforehand in the dictionary unit of the navigation system as questioning speeches for the navigation system, it is possible to cope with questionary utterances made in various modes by many people. In the voice guide, the guide may be made on the basis of the number of traffic lights other than the guide based on the number of intersection. Further, without or in addition to using the number of intersection or traffic lights, a route guide may be made using the distance from a specified institution up to a place to be guided.

As set forth above, in the navigation system according to one embodiment of the present invention, comprising an institution name recognizing unit which recognizes an institution name from a voice uttered by a user of the navigation system, an institution retrieving unit which retrieves, from among stored institution data, institutions located near the position of a vehicle equipped with the navigation system on the basis of the institution name recognized by the institution name recognizing unit, a user-uttered institution specifying unit which specifies an institution corresponding to the institution name uttered by the user from among the retrieved institutions, and a route guide unit which, when an institution has been specified by the useruttered institution specifying unit, aurally guides a route from the specified institution up to a place to be guided, if a route guide is made using institution information stored in a data storage medium, there is no concern that an institution unknown to the user may be guided, nor is there any concern that the guide may be conducted on the basis of such an institution that does not currently exist. The guide can be made with a voice in response to the user's question based on an institution viewed by the user.

The navigation system according to another embodiment of the present invention comprises a voice recognizing unit which recognizes a voice uttered by a user of the navigation system, a route guide request presence or absence determining unit which determines whether a speech of a route guide request is included in the voice recognized by the voice recognizing unit, an institution name extracting unit which extracts an institution name from the voice recognized by the voice recognizing unit, an institution retrieving unit which retrieves, from among stored institution data, institutions located near the position of a vehicle equipped with the navigation system on the basis of the institution name extracted by the institution name extracting unit, a user-uttered institution specifying unit which specifies an institution corresponding to the institution name uttered by the user from among the retrieved institutions, a route guide unit which when it is determined by the route guide request presence or absence determining unit that there has been a route guide request and when an institution has been specified by the useruttered institution specifying unit, guides a route from the specified institution up to a place to be guided, and a voice synthesizing unit which converts a signal provided from the route guide unit into a voice signal and outputs the voice signal. In addition to the foregoing effects, by checking to see if there is any speech of a route guide request uttered by the user, it is possible to start a positive route guide under confirmed intention of the user.

In the navigation system according to another embodiment of the present invention wherein the route guide request presence or absence determining unit is provided with a dictionary unit in which are registered such speeches as "I see", "How many more?", "That's okay, isn't it?", and "This is not the place, is it?", when any of those speeches is uttered by the user, it is possible to determine immediately that the uttered speech is an inquiry to the navigation system. Thus, it becomes easier and more certain to confirm the intention of the user.

In the navigation system according to another embodiment of the present invention wherein the route guide unit calculates the number of intersection or traffic lights located in the section from the specified institution up to the place to be guided and makes a route guide in accordance with the calculated number, the route guide based on the number of intersection can be appropriately utilized even in an area where there are many such small intersections are not equipped with traffic lights, while the route guide based on the number of traffic lights can be utilized easily by seeing traffic lights. In addition to these route guides there also can be made a route guide using the distance from the specified institution up to the intersection to be guided.

In the navigation system according to another embodiment of the present invention wherein when the institution name extracted by the institution name extracting unit is not included in the voice uttered by the user or when the institution uttered by the user is not specified by the user-uttered institution specifying unit, the route guide unit guides an institution name as a marker from among the retrieved institution data, it is possible to conduct the same route guide as in the prior art and thus the best route guide can always be selected and outputted.

In the navigation system according to another embodiment of the present invention, comprising a marker name recognizing unit which recognizes a marker name related to a guide route from a voice uttered by a user of the navigation system, an institution retrieving unit which retrieves, from among stored marker data, markers located near the position of a vehicle equipped with the navigation system on the basis of the marker name recognized by the marker name recognizing unit, a user-uttered marker specifying unit which specifies a marker corresponding to the marker name uttered by the user from among the retrieved markers, and a route guide unit which when a marker has been specified by the user-uttered marker specifying unit, aurally guides a route from the specified marker up to a place to be guided, not only an institution found out by the user but also anything capable of being seen by the user such as an intersection and capable of being utilized as a marker related to the guide route can be uttered, and navigation system can make an appropriate route guide on the basis of the uttered marker.

In the navigation system according to another embodiment of the present invention wherein the markers are institutions and intersections, not only when the user utters an institution but also when the user sees an intersection and utters it, the navigation system can make an appropriate route guide on the basis of the utterance.

The route guiding method in a navigation system according to another embodiment of the present invention comprises recognizing a voice uttered by a user of the navigation system, specifying an institution name from the recognized voice, retrieving, from stored institution data, institutions located near the position of a vehicle equipped with the navigation system on the basis of the specified institution name, specifying an institution corresponding to the institution name uttered by the user from among the retrieved institutions, and aurally guiding a route from the specified institution up to a place to be guided. Here, one does not have to worry whether an institution unknown to the user may be guided in the route guide or whether the route guide may be made on the basis of such an institution that is not in existence. Additionally, it is possible to make a aural guide responsive to a question asked by the user on the basis of an institution viewed by the user.

What is claimed is:

1. A navigation system comprising:
   an institution name extracting unit operable to extract an institution name from a voice uttered by a user of the navigation system;
   an institution retrieving unit operable to retrieve at least one institution located near the position of a vehicle equipped with the navigation system connected with said institution name extracting unit;
   a user-uttered institution specifying unit operable to specify an institution corresponding to the institution name uttered by the user; and
   route guide unit operable to aurally guide a route from a specified institution provided by said user-uttered institution specifying unit to a place to be guided.

2. The route guiding method in a navigation system of claim 1, wherein the number of intersections located between the specified institution and the place to be guided is calculated if a route guide request is included in the speech portion.

3. A navigation system comprising:
   a voice recognizing unit operable to recognize a voice uttered by a user of the navigation system;
   a route guide request presence or absence determining unit operable to determine whether a route guide request is included in a speech portion provided by a user whose voice is recognized by said voice recognizing unit;
   an institution name extracting unit operable to extract an institution name from the speech portion recognized by said voice recognizing unit;
   an institution retrieving unit operable to retrieve at least one institution located near the position of a vehicle equipped with the navigation system utilizing stored institution data and the institution name extracted by said institution name extracting unit;
   a user-uttered institution specifying unit operative to specify an institution corresponding to the institution name uttered by the user from at least one institution retrieved by the institution retrieving unit;
   a route guide unit operative to guide a route from a route from a specified institution provided by said user-uttered institution specifying unit to a place to be guided when it is determined by said route guide request presence or absence determining unit that there has been a route guide request; and
   a voice synthesizing unit operable'to convert a signal provided from said route guide unit into a voice signal and output the voice signal.

4. The navigation system of claim 3 wherein said route guide request presence or absence determining unit is connected with a dictionary unit.

5. The navigation system of claim 3 wherein said route guide unit is operable to calculate the number of intersections located between the specified institution and the place to be guided.

6. The navigation system of claim 3 wherein said route guide unit is operable to calculate the number of traffic lights located between the specified institution and the place to be guided.

7. The navigation system of claim 3 wherein said route guide unit guides an institution name as a marker when the institution name extracted by said institution name extracting unit is not included in the voice uttered by the user.

8. The navigation system of claim 3 wherein said route guide unit guides an institution name as a marker when the institution uttered by the user is not specified by said user-uttered institution specifying unit.

9. A navigation system comprising:
   a marker name recognizing unit operable to recognize a marker name related to a guide route from a speech portion uttered by a user of the navigation system;
   a marker retrieving unit operable to retrieve at least one marker located near the position of a vehicle equipped with the navigation system utilizing the marker name recognized by said marker name recognizing unit;
   a user-uttered marker specifying unit operable to specify a marker corresponding to the marker name uttered by the user from at least one of the markers retrieved by the marker retrieving unit; and
   a route guide unit operable to aurally guide a route from a marker specified by said user-uttered market specifying unit to a place to be guided.

10. The navigation system of claim 9 wherein said markers are institutions and intersections.

11. A route guiding method in a navigation system comprising the acts of:
    recognizing an institution name from a speech portion uttered by a user of the navigation system;

retrieving at least one institution located near the position of a vehicle equipped with the navigation system;

specifying an institution corresponding to the institution name uttered by the user; and aurally guiding a route from the specified institution to a place to be guided.

12. A route guiding method in a navigation system comprising the acts of:

recognizing a voice uttered by a user of the navigation system;

determining whether a route guide request is included in a speech portion with a recognized voice;

extracting an institution name from the speech portion;

retrieving at least one institution located near the position of a vehicle equipped with the navigation system utilizing the extracted institution name;

specifying an institution corresponding to the institution name uttered by the user from among the retrieved institutions; and aurally guiding a route from the specified institution to a place to be guided when a route guide request is included in the speech portion.

13. The route guiding method in a navigation system of claim 12 wherein the number of traffic lights located between the specified institution and the place to guided is calculated if a route guide request is included in the speech portion.

14. A route guiding method in a navigation system according to claim 12 wherein an institution name is selected from retrieved institution data if the institution uttered by the user is not identifiable.

15. A route guiding method in a navigation system of claim 12 wherein a route from the current vehicle position to the place to be guided is guided an institution name is not included in the speech portion.

* * * * *

UNITED STATES PATENT AND TRADEMARK OFFICE
CERTIFICATE OF CORRECTION

PATENT NO.     : 6,480,786 B2
DATED          : November 12, 2002
INVENTOR(S)    : Mitsuaki Watanabe et al.

It is certified that error appears in the above-identified patent and that said Letters Patent is hereby corrected as shown below:

Column 15,
Line 57, insert -- a -- before "route".

Column 16,
Line 24, delete "operable'to" and substitute -- operable to -- in its place.

Signed and Sealed this

Fifteenth Day of July, 2003

JAMES E. ROGAN
*Director of the United States Patent and Trademark Office*